United States Patent
Spiegel et al.

(10) Patent No.: US 10,279,315 B2
(45) Date of Patent: *May 7, 2019

(54) SYSTEMS AND METHODS FOR WATER FILTRATION

(71) Applicant: Aqua Tru, LLC, Sherman Oaks, CA (US)

(72) Inventors: Peter G. Spiegel, Sherman Oaks, CA (US); Michael A. Pedersen, Sherman Oaks, CA (US)

(73) Assignee: Aqua Tru, LLC, Sherman Oaks, CA (US)

( * ) Notice: Subject to any disclaimer, the term of this patent is extended or adjusted under 35 U.S.C. 154(b) by 351 days.

This patent is subject to a terminal disclaimer.

(21) Appl. No.: 15/239,023

(22) Filed: Aug. 17, 2016

(65) Prior Publication Data

US 2017/0029293 A1 Feb. 2, 2017

Related U.S. Application Data

(63) Continuation of application No. 14/809,526, filed on Jul. 27, 2015, now Pat. No. 9,422,173.

(51) Int. Cl.
*B01D 61/08* (2006.01)
*B01D 29/56* (2006.01)
(Continued)

(52) U.S. Cl.
CPC ............. *B01D 61/08* (2013.01); *B01D 29/56* (2013.01); *C02F 1/003* (2013.01); *C02F 1/283* (2013.01); *C02F 1/32* (2013.01); *C02F 1/42* (2013.01); *C02F 1/441* (2013.01); *C02F 1/461* (2013.01); *C02F 1/68* (2013.01); *B01D 2311/14* (2013.01); *B01D 2311/2623* (2013.01); *B01D 2311/2626* (2013.01); *B01D 2311/2649* (2013.01); *B01D 2311/2684* (2013.01); *B01D 2313/13* (2013.01); *B01D 2313/18* (2013.01);
(Continued)

(58) Field of Classification Search
CPC .... C02F 1/461; C02F 1/32; C02F 1/68; C02F 1/42; C02F 1/283; C02F 1/003; C02F 1/441; C02F 2307/06; C02F 2307/10; C02F 2201/005; C02F 2301/046; B01D 61/08; B01D 29/56; B01D 2311/2684; B01D 2317/08; B01D 2311/14; B01D 2311/2623; B01D 2311/2626; B01D 2311/2649; B01D 2313/13; B01D 2313/18; B01D 2313/50; B01D 2317/02
See application file for complete search history.

(56) References Cited

U.S. PATENT DOCUMENTS 4,626,346 A 12/1986 Hall
4,752,389 A 6/1988 Burrows
(Continued)

*Primary Examiner* — Krishnan S Menon
*Assistant Examiner* — Waqaas Ali
(74) *Attorney, Agent, or Firm* — Eversheds Sutherland (US) LLP

(57) ABSTRACT

A water filtration systems may comprise an under the sink RO water filtration system that is plumed into a building's water supply. For example, the water filtration systems may include an RO device at least partially installed underneath a sink, with the tap water connection plumbed directly to the sink cold water supply line, and a waste water drain line connected directly to the sink drain, such as the p-trap.

4 Claims, 3 Drawing Sheets

(51) Int. Cl.
*C02F 1/461* (2006.01)
*C02F 1/32* (2006.01)
*C02F 1/68* (2006.01)
*C02F 1/42* (2006.01)
*C02F 1/00* (2006.01)
*C02F 1/44* (2006.01)
*C02F 1/28* (2006.01)

(52) U.S. Cl.
CPC ...... *B01D 2313/50* (2013.01); *B01D 2317/02* (2013.01); *B01D 2317/08* (2013.01); *C02F 2201/005* (2013.01); *C02F 2301/046* (2013.01); *C02F 2307/06* (2013.01); *C02F 2307/10* (2013.01)

(56) References Cited

U.S. PATENT DOCUMENTS

| | | |
|---|---|---|
| 5,122,265 A | 6/1992 | Mora et al. |
| 5,254,243 A | 10/1993 | Carr et al. |
| 5,714,066 A | 2/1998 | Jang |
| 5,997,738 A * | 12/1999 | Lin .................... B01D 61/025 210/102 |
| 6,764,595 B1 | 7/2004 | Halemba et al. |
| 2003/0094406 A1 | 5/2003 | Smith |
| 2003/0102269 A1 | 6/2003 | Bender |
| 2004/0238423 A1 | 12/2004 | Schmitt |

* cited by examiner

SYSTEMS AND METHODS FOR WATER FILTRATION

CROSS-REFERENCE TO RELATED APPLICATIONS

The disclosure is a continuation of U.S. patent application Ser. No. 14/809,526, filed Jul. 27, 2015, which is incorporated herein by reference.

FIELD OF THE DISCLOSURE

The disclosure generally relates to water filtration and more particularly relates to systems and methods for reverse osmosis water filtration.

BACKGROUND

Due to increased levels of toxicity caused by chemicals found within the water supply, water filtration has become widespread within many homes. Point-of-use (POU) water treatment devices are designed to treat drinking water for use in the home. These devices can be attached to a faucet and/or installed under a sink. They differ from point-of-entry (POE) devices, which are installed on the water line as it enters the home and treats all the water in the building.

Many households today have reverse-osmosis (RO) units installed. These devices use a membrane that screens out chemicals, such as chloride and sulfate as well as most other contaminates found in the water supply. RO systems are generally multi-stage systems and include an activated charcoal filter since RO does not remove volatile organic compounds. A RO system can remove particles down to 1 Angstrom. However POU RO systems can waste a substantial amount of water for every gallon that is treated. This is because RO purification at normal water pressure is roughly twenty percent efficient. Accordingly, there is a need for a POU RO system that provides filtered water while minimizing waste water.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Described below are embodiments of water filtration systems (as well as individual components of the water filtration systems). Methods of using the water filtration systems are also disclosed. In some instances, the water filtration systems may comprise an under the sink RO water filtration system that is plumed into a building's water supply. For example, the water filtration systems may include an RO device at least partially installed underneath a sink, with the tap water connection plumbed directly to the sink cold water supply line, and a waste water drain line connected directly to the sink drain, such as the p-trap. The water filtration systems may use a membrane to screen out chemicals, such as chloride and sulfate as well as most other contaminates found in the water supply. The water filtration systems may be used to filter any contaminates. In this manner, the water filtration systems may provide the technical advantage and/or solution of providing filtered water. Moreover, the water filtration systems may provide the technical advantage and/or solution of little to no waste water. These and other technical advantages and/or solutions will become apparent throughout the disclosure.

Figure 1:
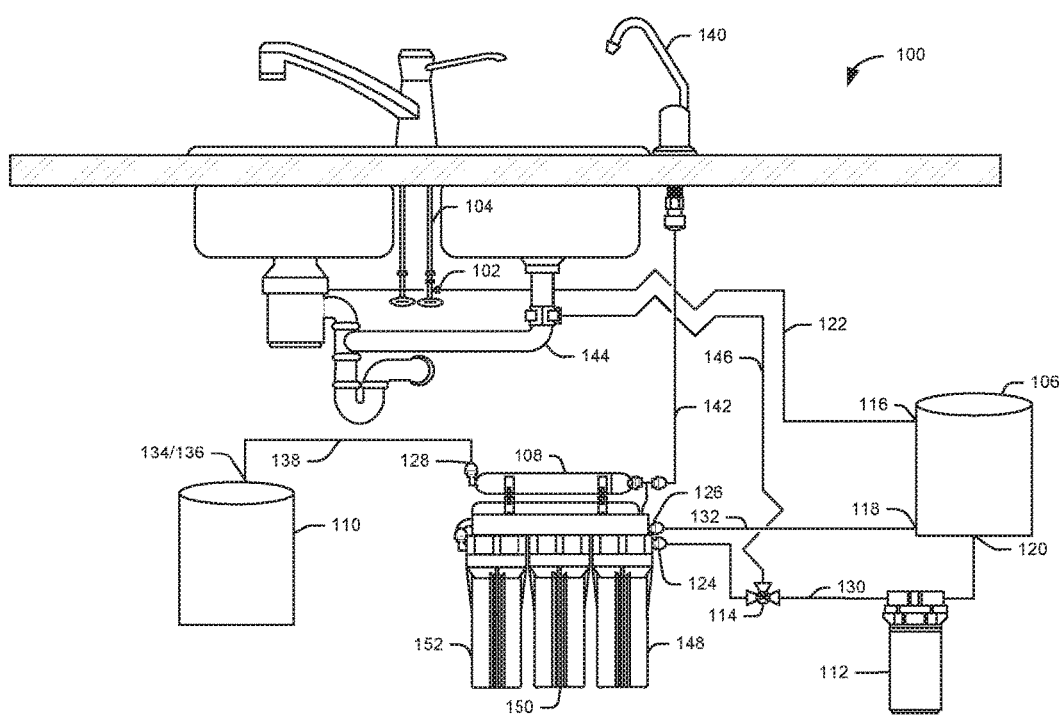
FIG. 1 schematically depicts a water filtration system in accordance with one or more embodiments of the disclosure.

In one embodiment, as depicted in FIG. 1, the water filtration system may include a reverse osmosis water treatment system 100. The system 100 may include a source of water 102, such as tap water from a sink's cold water supply line 104. Any source of water 102 may be used herein. The system 100 also may include a water tank 106, a filter system 108, a filtered water tank 110, a pump 112, and a valve 114. The water tank 106 may include a first inlet 116, a second inlet 118, and an outlet 120. The first inlet 116 of the water tank 106 may be in fluid communication with the source of water 102 by way of a pipe 122. In this manner, the water tank 106 may store water therein.

The filter system 108 may comprise an inlet 124, a first outlet 126, and a second outlet 128. The inlet 124 of the filtration system 108 may be in fluid communication with the outlet 120 of the water tank 106 by way of a pipe 130. Also, the first outlet 126 of the filter system 108 may be in fluid communication with the second inlet 118 of the water tank 106 by way of a pipe 132. In this manner, the first outlet 126 of the filter system 108 may supply waste water from the filter system 108 to the water tank 106. As a result, the water tank 106 may include a mixture of water from the source of water 102 and waste water from the filter system 108.

The filtered water tank 110 may include an inlet 134 and an outlet 136. In some instances, the inlet 134 and the outlet 136 of the filtered water tank 110 may be one in the same, such as a two-way valve or the like. In other instances, the inlet 134 and the outlet 136 of the filtered water tank 110 may be separate components. The inlet 134 of the filtered water 110 tank may be in fluid communication with the second outlet 128 of the filter system 108 by way of a pipe 138. In this manner, the second outlet 128 of the filter system 108 may supply filtered water to the filtered water tank 110. In addition, the outlet 136 of the filtered water tank 110 may be in fluid communication with a faucet 140 by way of a pipe 142. In this manner, the outlet 136 of the filtered water tank 110 may supply the filtered water to the faucet 140.

The pump 112 may be disposed in fluid communication between the water tank 106 and the filter system 108 along the pipe 130. In addition, the valve 114 may be disposed in fluid communication between the pump 112 and the filter system 108 along the pipe 130. The valve 114 also may be in fluid communication with a drain 144 by way of a drain pipe 146. In some instances, the valve 114 may be a three-way valve or the like. The valve 114 may divert a first portion of water from the water tank 106 to the filter system by way of the pipe 130. In some instances, the first portion of water may comprise about 95% of the water that enters the valve 114. Moreover, the valve 114 may divert a second portion of water from the water tank 106 to the drain 144 by way of the drain pipe 146. In some instances, the second portion of water may comprise about 5% of the water that enters the valve 114. Any percentage of water may be supplied to the filter system 108 or diverted to the drain 144. In a preferred embodiment, the majority of the water in the system 100 is filtered, with a minimal amount of water being disposed of via the drain 144.

In some instances, the filter system 108 may comprise a first filter 148, a second filter 150, and a third filter 152. The first filter 148 may be configured to receive water from the inlet 124 of the filter system 108. The first filter 148 may filter the water and deliver a first filtered water to the second filter 150. The second filter 150 may be configured to receive the first filtered water from the first filter 148. The second filter 150 may bifurcate the first filtered water into a first portion and a second portion. The second filter 150 may be a reverse osmosis filter or the like. The first portion of the first filtered water may be supplied to the first outlet 126 of the filter system 108. In this manner, the first portion of the first filtered water may comprise the waste water that is delivered back to the water tank 106 via pipe 132. The second portion of the first filtered water may be supplied to the third filter 152. The third filter 152 may be configured to receive the filtered water from the second filter 150, to further filter the water, and to deliver the filtered water to the second outlet 128 of the filter system 108. In this manner, the second portion of the first filtered water, which is collectively filtered by the first filter 148, the second filter 150, and the third filter 152, comprises the filtered water that is supplied the filtered water tank 110 via pipe 138.

In certain embodiment, the first filter 148 may comprise a sediment filter, a carbon filter, a KDF filter, or a combination thereof. The second filter 150 may comprise a reverse osmosis membrane. The third filter 152 may comprises a carbon filter, an ion exchange filter, a remineralization element, or a combination thereof. In other instances, the third filter 152 may be omitted. In such instances, the second filter 150 may be configured to filter and deliver the second portion of the first filtered water to the filtered water tank 110. In yet other instances, additional filters may be disposed downstream of the third filter 150 before the filtered water tank 110. Any number, type, and/or combination of filters may be used herein.

In certain embodiments, 100% of the water that enters the first filter 148 may pass to the second filter 150. In other instances, less than 100% of the water that enters the second filter 150 passes to the third filter 152. For example, about 1% to about 30% of the water that enters the second filter 150 may pass to the third filter 152, with the remaining water constituting the waste water that is delivered back to the water tank 106 via pipe 132. In yet another embodiment, 100% of the water that enters the third filter 152 may pass to the filtered water tank 110 via pipe 138. Any percentage of water may enter the first filter 148, the second filter 150, or the third filter 152.

In operation, water is supplied to the water tank 106 from the water source 102 via pipe 122. The water source 102 may continually feed the water tank 106 as needed, leaving at least some space within the water tank 106 for waste water from the filter system 108. In some instances, a valve may be disposed along pipe 122 to control the flow of fluid to the water tank 106. The pump 112 may pump the mixture of source water and waste water from the water tank 106 into the valve 114. The valve 114 may then bifurcate a small portion of the water into the drain 144 and a majority of the water into the filtration system 108. In this manner, most of the water is filtered and supplied to the filtered water tank 110 to be dispensed by the faucet 140. A small portion of the waste water is recycled back to the water tank 106 by way of the pipe 132 to be mixed with the source water and the cycle continued.

The system 100 may include additional components and functionality. For example, the system 100 may include a UV treatment device, a heater, a chiller, and/or a carbonator. In addition, the system 100 may include devices capable of adding vitamins to the water and/or re-mineralizing the water. In certain embodiments, the system 100 may include a supply of electrical power, an electronic controller, and one or more sensors to monitor and control the dispensing of filtered water.

Figure 2:
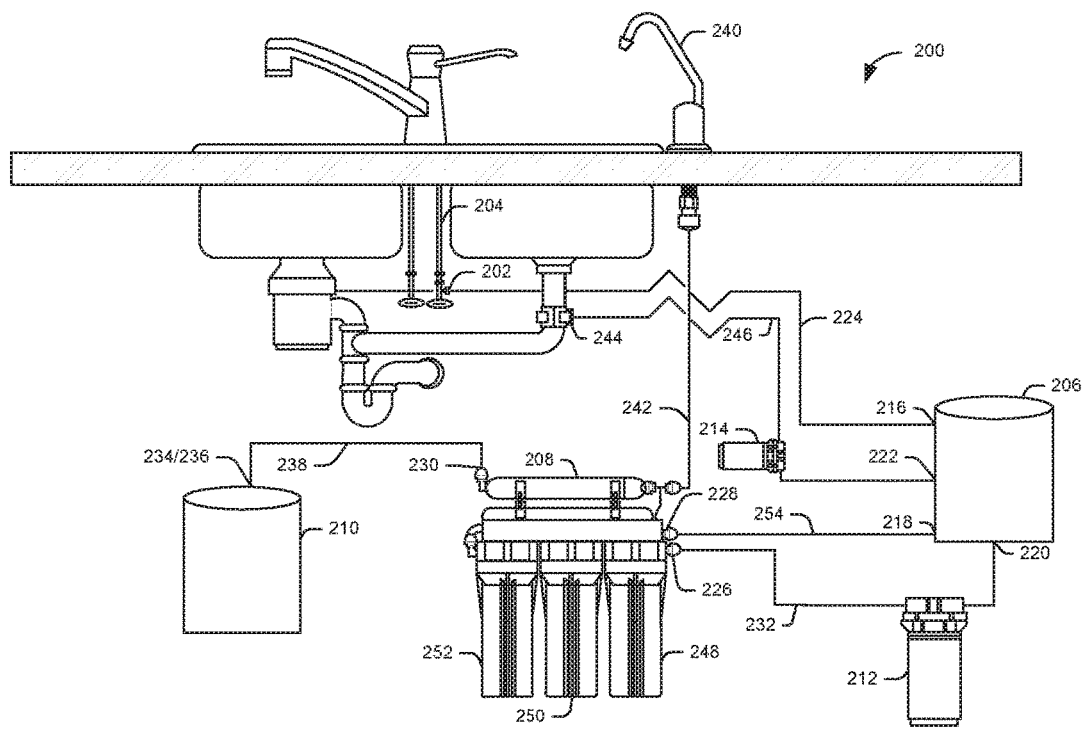
FIG. 2 schematically depicts a water filtration system in accordance with one or more embodiments of the disclosure.

FIG. 2 depicts an additional embodiment of a water filtration system comprising a reverse osmosis water treatment system 200. The system 200 may include a source of water 202, such as tap water from a sink's cold water supply line 204. Any source of water 202 may be used herein. The system 200 also may include a water tank 206, a filter system 208, a filtered water tank 210, a first pump 212, and a second pump 214. The water tank 206 may include a first inlet 216, a second inlet 218, a first outlet 220, and a second outlet 222. The first inlet 216 of the water tank 206 may be in fluid communication with the source of water 202 by way of a pipe 224.

The filter system 208 may include an inlet 226, a first outlet 228, and a second outlet 230. The inlet 226 of the filtration system 208 may be in fluid communication with the first outlet 220 of the water tank 206 bay way of a pipe 232. In addition, the first outlet 228 of the filter system 208 may be in fluid communication with the second inlet 218 of the water tank 206 by way of a pipe 254. In this manner, the first outlet 228 of the filter system 208 may supply waste water to the water tank 206 via pipe 254. As a result, the water tank 206 may comprise a mixture of water from the source of water 202 and waste water from the filter system 208.

The filtered water tank 210 may include an inlet 234 and an outlet 236. In some instances, the inlet 234 and the outlet 236 of the filtered water tank 210 may be one in the same, such as a two-way valve or the like. In other instances, the inlet 234 and the outlet 236 of the filtered water tank 210 may be separate components. The inlet 234 of the filtered water 210 tank may be in fluid communication with the second outlet 230 of the filter system 208 by way of a pipe 238. In this manner, the second outlet 230 of the filter system 208 may supply filtered water to the filtered water tank 210 via pipe 238. In addition, the outlet 236 of the filtered water tank 210 may be in fluid communication with a faucet 240 by way of a pipe 242. In this manner, the outlet 236 of the filtered water tank 210 may supply the filtered water to the faucet 240 via pipe 242.

The first pump 212 may be disposed in fluid communication between the water tank 206 and the filter system 208 along the pipe 232. The first pump 212 may facilitate flow between the water tank 206 and the filter system 208. The second pump 214 may be disposed in fluid communication between the water tank 206 and a drain 244. For example, the second outlet 222 of the water tank 206 may be in fluid communication with the second pump 214. The second pump 214 may be configured to supply a portion of the water from the water tank 206 to the drain 244 by way of a drain pipe 246.

In some instances, the filter system 208 may comprise a first filter 248, a second filter 250, and a third filter 252. The first filter 248 may be configured to receive water from the inlet 226 of the filter system 208. The first filter 248 may filter the water and deliver a first filtered water to the second filter 250. The second filter 250 may be configured to receive the first filtered water from the first filter 248. The second filter 250 may bifurcate the first filtered water into a first portion and a second portion. The second filter 250 may comprise a reverse osmosis filter or the like. The first portion of the first filtered water may be supplied to the first outlet 228 of the filter system 108. In this manner, the first portion of the first filtered water may comprise the waste water that is delivered back to the water tank 206 by way of the pipe 254. The second portion of the first filtered water may be supplied to the third filter 252. The third filter 252 may be configured to receive the filtered water from the second filter 250, to further filter the water, and to deliver the filtered water to the second outlet 230 of the filter system 208. In this manner, the second portion of the first filtered water, which is collectively filtered by the first filter 248, the second filter 250, and the third filter 252, comprises the filtered water that is supplied the filtered water tank 210 by way of the pipe 238.

In certain embodiment, the first filter 248 may comprise a sediment filter, a carbon filter, a KDF filter, or a combination thereof. The second filter 250 may comprise a reverse osmosis membrane. The third filter 250 may comprises a carbon filter, an ion exchange filter, a remineralization element, or a combination thereof. In other instances, the third filter 252 may be omitted. In such instances, the second filter 250 may be configured to filter and deliver the second portion of the first filtered water to the filtered water tank 210. In yet other instances, additional filters may be disposed downstream of the third filter 250 before the filtered water tank 210. Any number, type, and/or combination of filters may be used herein.

In certain embodiments, 100% of the water that enters the first filter 248 may pass to the second filter 250. In other instances, less than 100% of the water that enters the second filter 250 passes to the third filter 252. For example, about 1% to about 30% of the water that enters the second filter 250 may pass to the third filter 252, with the remaining water constituting the waste water that is delivered back to the water tank 206 via the pipe 254. In yet another embodiment, 100% of the water that enters the third filter 252 may pass to the filtered water tank 210 via the pipe 238. Any percentage of water may enter the first filter 248, the second filter 250, or the third filter 252.

In operation, water is supplied to the water tank 206 from the water source 202 via the pipe 224. The water source 202 may continually feed the water tank 206 as needed, leaving at least some space within the water tank 206 for waste water from the filter system 208. In some instances, a valve may be disposed along pipe 224 to control the flow of water to the water tank 206. The first pump 212 may pump the mixture of source water and waste water from the water tank 206 to the filter system 208. As discussed above, the filter system 208 may filter a portion of the water, which may be supplied to the filtered water tank 210 to be dispensed by the faucet 240. All of the waste water from the filter system 208 may be recycled back to the water tank 106 via the pipe 254 to be mixed with the source water and the cycle continued. The second pump 214 may empty a portion of the water from the water tank 206 to the drain 244 via the pipe 246.

The system 200 may include additional components and functionality. For example, the system 200 may include a UV treatment device, a heater, a chiller, and/or a carbonator. In addition, the system 200 may include devices capable of adding vitamins to the water and/or re-mineralizing the water. In certain embodiments, the system 200 may include a supply of electrical power, an electronic controller, and one or more sensors to monitor and control the dispensing of filtered water.

Figure 3:
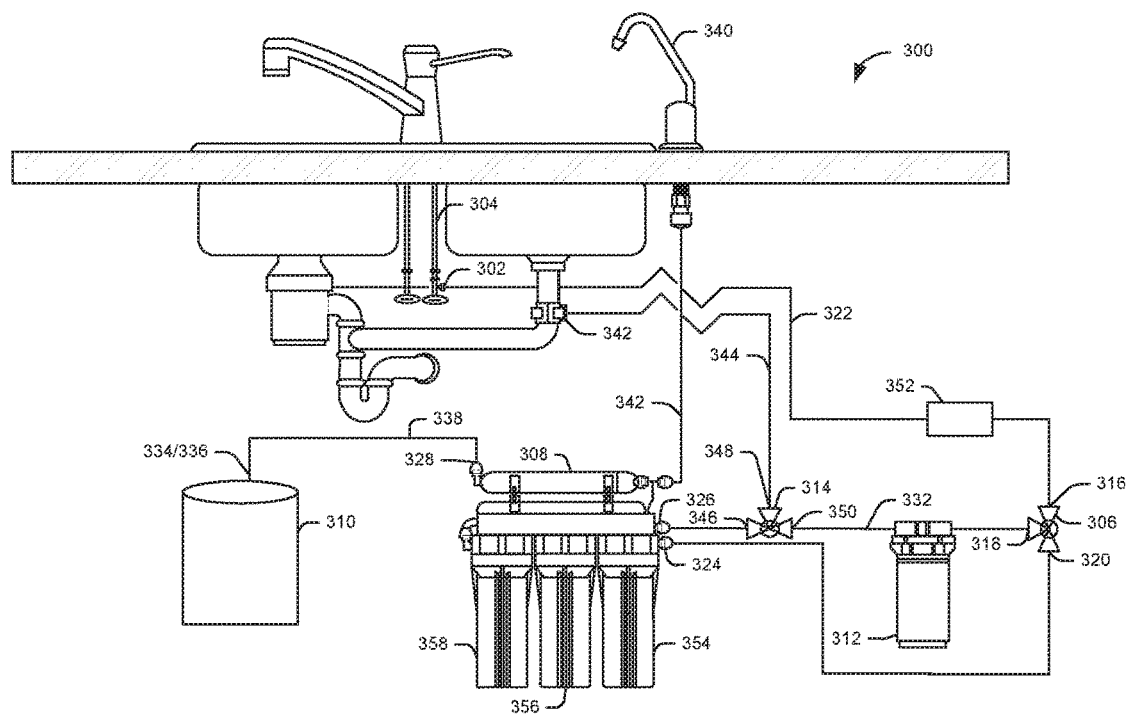
FIG. 3 schematically depicts a water filtration system in accordance with one or more embodiments of the disclosure.

FIG. 3 depicts an additional embodiment of a water filtration system comprising a reverse osmosis water treatment system 300. The system 300 may include a source of water 302, such as tap water from a sink's cold water supply line 304. Any source of water 302 may be used herein. The system 300 also may include a first three-way valve 306, a filter system 308, a filtered water tank 310, a pump 312, and a second three-way valve 314. The first three-way valve 306 may include a first inlet 316, a second inlet 318, and an outlet 320. The first inlet 316 of the first three-way valve 306 may be in fluid communication with the source of water 302 by way of a pipe 322.

The filter system 308 may comprise an inlet 324, a first outlet 326, and a second outlet 328. The inlet 324 of the filtration system 308 may be in fluid communication with the outlet 320 of the first three-way valve 306 by way of a pipe 330. In addition, the first outlet 326 of the filter system 308 may be in fluid communication with the second inlet 318 of the first three-way valve 306 by way of a pipe 332. In this manner, the first outlet 326 of the filter system 308 may supply waste water from the filter system 308 to the first three-way valve 306. The first three-way valve 306 may mix water from the source of water 302 and waste water from the filter system 308. In some instances, the first three-way valve 306 may comprise a water tank or the like.

The filtered water tank 310 may include an inlet 334 and an outlet 336. In some instances, the inlet 334 and the outlet 336 of the filtered water tank 310 may be one in the same, such as a two-way valve or the like. In other instances, the inlet 334 and the outlet 336 of the filtered water tank 310 may be separate components. The inlet 334 of the filtered water 310 tank may be in fluid communication with the second outlet 328 of the filter system 308 by way of a pipe 338. In this manner, the second outlet 328 of the filter system 308 may supply filtered water to the filtered water tank 310 via the pipe 338. In addition, the outlet 336 of the filtered water tank 310 may be in fluid communication with a faucet 340 by way of a pipe 342. In this manner, the outlet 336 of the filtered water tank 310 may supply the filtered water to the faucet 340 via the pipe 342.

The pump 312 may be disposed in fluid communication between the first three-way valve 306 and the filter system 308 along the pipe 332. In addition, the second three-way valve 314 may be disposed in fluid communication between the first three-way valve 306 and the filter system 308 along the pipe 332. The second three-way valve 314 may be in fluid communication with a drain 342 by way of a drain pipe 344. The second three-way valve 314 may include a first inlet 346, a first outlet 348, and a second outlet 350. In this manner, the second three-way valve 314 may divert a first portion of water from the filter system 308 to the first three-way valve 306 by way of the second outlet 350. In some instances, the first portion of water may comprise about 75% of the water that enters the second three-way valve 314. Moreover, the second three-way valve 314 may divert a second portion of water from the filter system 308 to the drain 342 by way of the first outlet 348 and the pipe 344. In some instances, the second portion of water may comprise about 25% of the water that enters the second three-way valve 314. Any percentage of water may be supplied to the first three-way valve 306 or diverted to the drain 342. In this manner, the majority of the water in the system 300 is filtered, with a minimal amount of water being wasted.

In some instances, the system 300 may include a pressure reducer 352 disposed in fluid communication between the source of water 302 and the first three-way valve 306 along the pipe 322. The pressure reducer 352 may provide the source water 302 to the first three-way valve 306 at a suitable pressure, such as 80 PSI. Any pressure may be used herein.

In some instances, the filter system 308 may comprise a first filter 354, a second filter 356, and a third filter 358. The first filter 354 may be configured to receive water from the inlet 324 of the filter system 308. The first filter 354 may filter the water and deliver a first filtered water to the second filter 356. The second filter 356 may be configured to receive the first filtered water from the first filter 354. The second filter 356 may bifurcate the first filtered water into a first portion and a second portion. The second filter 356 may comprise a reverse osmosis filter to the like. The first portion of the first filtered water may be supplied to the first outlet 326 of the filter system 308. In this manner, the first portion of the first filtered water may comprise the waste water that is delivered back to the first three-way valve 306 by way of the pipe 332. The second portion of the first filtered water may be supplied to the third filter 358. The third filter 358 may be configured to receive the filtered water from the second filter 356, to further filter the water, and to deliver the filtered water to the second outlet 328 of the filter system 308. In this manner, the second portion of the first filtered water, which is collectively filtered by the first filter 248, the second filter 250, and the third filter 252, comprises the filtered water that is supplied the filtered water tank 310 by way of the pipe 338.

In certain embodiment, the first filter 354 may comprise a sediment filter, a carbon filter, a KDF filter, or a combination thereof. The second filter 356 may comprise a reverse osmosis membrane. The third filter 358 may comprises a carbon filter, an ion exchange filter, a remineralization element, or a combination thereof. In other instances, the third filter 358 may be omitted. In such instances, the second filter 356 may be configured to filter and deliver the second portion of the first filtered water to the filtered water tank 310. In yet other instances, additional filters may be disposed downstream of the third filter 358 before the filtered water tank 310. Any number, type, and/or combination of filters may be used herein.

In certain embodiments, 100% of the water that enters the first filter 354 may pass to the second filter 356. In other instances, less than 100% of the water that enters the second filter 356 passes to the third filter 358. For example, about 1% to about 30% of the water that enters the second filter 356 may pass to the third filter 358, with the remaining water constituting the waste water that is delivered back to the first three-way-valve 306 by way of the pipe 332. In yet another embodiment, 100% of the water that enters the third filter 358 may pass to the filtered water tank 310. Any percentage of water may enter the first filter 354, the second filter 356, or the third filter 358.

In operation, water is supplied to the first three-way-valve 306 from the water source 302 via the pipe 322. The pressure reducer 352 may provide the water to the first three-way-valve 306 at a suitable pressure. The water source 302 may continually feed the first three-way-valve 306 as needed. Waste water from the filter system 308 may mix with water from the water source 302 in the first three-way-valve 306. For example, as discussed above, the filter system 308 may filter a portion of the water, which may be supplied to the filtered water tank 310 to be dispensed by the faucet 340. A small portion of the waste water from the filter system 308 may be recycled back to the first three-way-valve 306 via the pipe 332 to be mixed with the source water and the cycle continued. The second three-way-valve 314 may divert a portion of the waste water from the filter system 308 to the drain 342 via the drain pipe 344.

The system 300 may include additional components and functionality. For example, the system 300 may include a UV treatment device, a heater, a chiller, and/or a carbonator. In addition, the system 300 may include devices capable of adding vitamins to the water and/or re-mineralizing the water. In certain embodiments, the system 300 may include a supply of electrical power, an electronic controller, and one or more sensors to monitor and control the dispensing of filtered water.

The water filtration systems in FIG. 1-3 may significantly reduce operation cost and the environmental impact of wasted water as compared to conventional RO systems. For example, the systems described in FIGS. 1-3 provide under the sink RO systems that waste less water than conventional RO systems. In some instances, a conventional RO system may waste 70% to 90% of the water processed. The present systems, however, may substantially reduce waste water to about 10% to 30%.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A reverse osmosis water treatment system, comprising:
a source of water;
a water tank comprising a first inlet, a second inlet, and an outlet, wherein the first inlet of the water tank is in fluid communication with the source of water by way of a first pipe;
a filter system comprising an inlet, a first outlet, and a second outlet, wherein the inlet of the filtration system is in fluid communication with the outlet of the water tank by way of a second pipe, wherein the first outlet of the filter system is in fluid communication with the second inlet of the water tank by way of a third pipe, wherein the first outlet of the filter system supplies waste water from the filter system to the water tank, and wherein the water tank comprises a mixture of water from the source of water and waste water from the filter system;
a faucet in fluid communication with the second outlet of the filter system, wherein the second outlet of the filter system supplies filtered water to the faucet;

a pump disposed in fluid communication along the second pipe between the water tank and the filter system; and a valve disposed in fluid communication along the second pipe between the pump and the filter system and in fluid communication with a drain by way of a fourth pipe, wherein the valve diverts a first portion of water from the water tank to the filter system via the second pipe, and wherein the valve diverts a second portion of water from the water tank to the drain via the fourth pipe.

2. The system of claim 1, wherein the filter system further comprises:

a first filter and a second filter;

wherein the first filter is configured and disposed to receive water from the inlet of the filter system and to filter and deliver a first filtered water to the second filter; and wherein the second filter is configured and disposed to receive the first filtered water from the first filter, to deliver a first portion of the first filtered water to the first outlet of the filter system, the first portion of the first filtered water being the waste water that is delivered back to the water tank, and to filter and deliver a second portion of the first filtered water, the second portion of the first filtered water being the filtered water.

3. The system of claim 2, wherein the filter system further comprises a third filter, wherein the third filter is configured and disposed to receive the filtered water from the second filter and to further filter and deliver the filtered water to the second outlet of the filter system.

4. The system of claim 3, wherein:

the first filter comprises a sediment filter, a carbon filter, a Kinetic Degradation Fluxion filter, or a combination thereof;

the second filter comprises a reverse osmosis membrane; and the third filter comprises a carbon filter, an ion exchange filter, a remineralization element, or a combination thereof.

* * * * *